United States Patent [19] [11] Patent Number: 4,793,639
Glover et al. [45] Date of Patent: Dec. 27, 1988

[54] TUBE COUPLING MECHANISM

[75] Inventors: Alfred H. Glover, Decatur; Joseph T. Betterton, Arab; Daniel F. Lawless, Hazel Green; Anthony M. Michalovic, Decatur, all of Ala.

[73] Assignee: Chrysler Motors Corporation, Highland Park, Mich.

[21] Appl. No.: 188,015

[22] Filed: Apr. 29, 1988

[51] Int. Cl.4 .................... F16L 37/00; F16L 47/00
[52] U.S. Cl. ..................... 285/319; 285/423; 285/921
[58] Field of Search ............... 285/319, 921, 423, 320

[56] References Cited

U.S. PATENT DOCUMENTS

| 418,513 | 12/1889 | Hackley . | |
|---|---|---|---|
| 3,245,703 | 4/1966 | Manly . | |
| 3,394,954 | 7/1968 | Sarns | 285/319 |
| 3,686,896 | 8/1972 | Rutter | 285/319 X |
| 3,826,523 | 7/1974 | Eschbaugh . | |
| 3,933,406 | 1/1976 | Cameron et al. | 285/921 X |
| 4,123,091 | 10/1978 | Cosentino et al. . | |
| 4,601,497 | 7/1986 | Bartholomew | 285/319 |
| 4,673,200 | 6/1987 | Miyauchi | 285/921 X |
| 4,682,798 | 7/1987 | Sauer | 285/319 X |
| 4,743,051 | 5/1988 | Proni | 285/319 |

FOREIGN PATENT DOCUMENTS 2077377 12/1981 United Kingdom ............... 285/921

Primary Examiner—Thomas F. Callaghan
Attorney, Agent, or Firm—Kenneth H. MacLean, Jr.

[57] ABSTRACT

A coupling device for tubing for use in pressurized fluid systems and having a locking and unlocking actuator lever supported by an annulus in a flexible manner producing a mild bending movement of the annulus corresponding to pivotal movements of the lever.

9 Claims, 2 Drawing Sheets

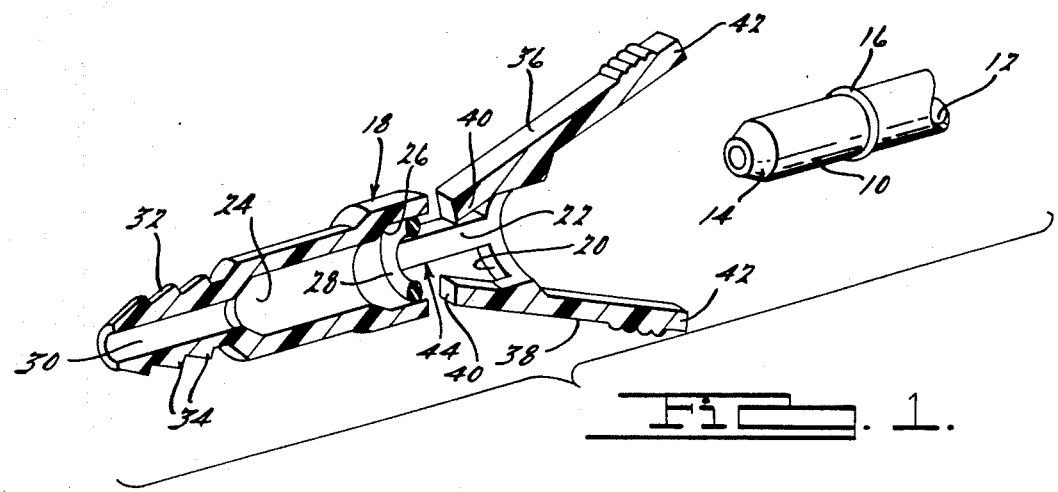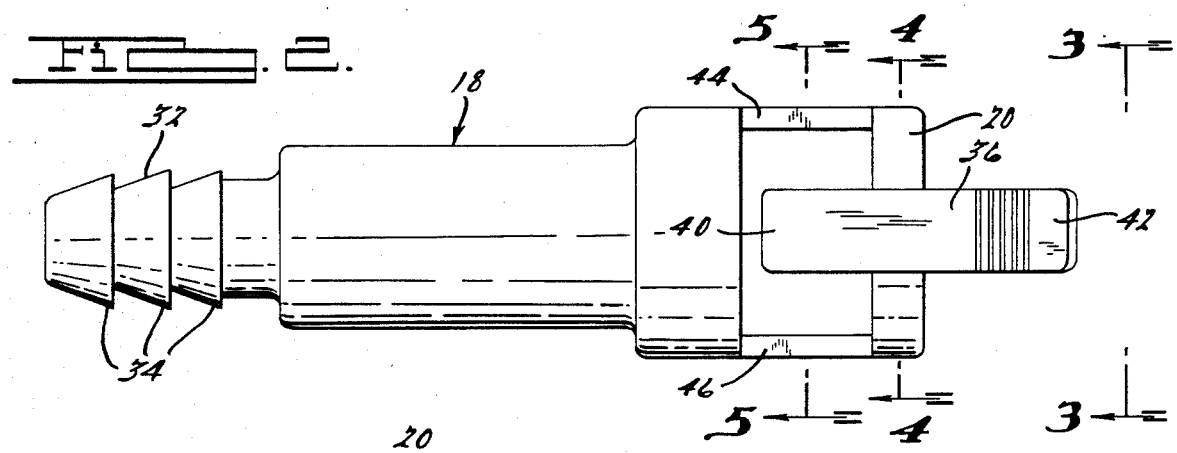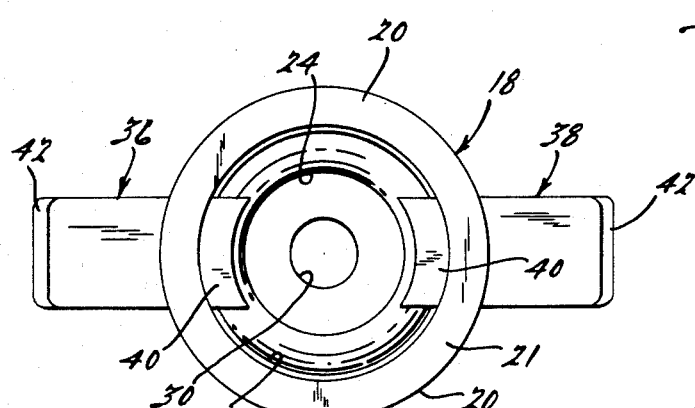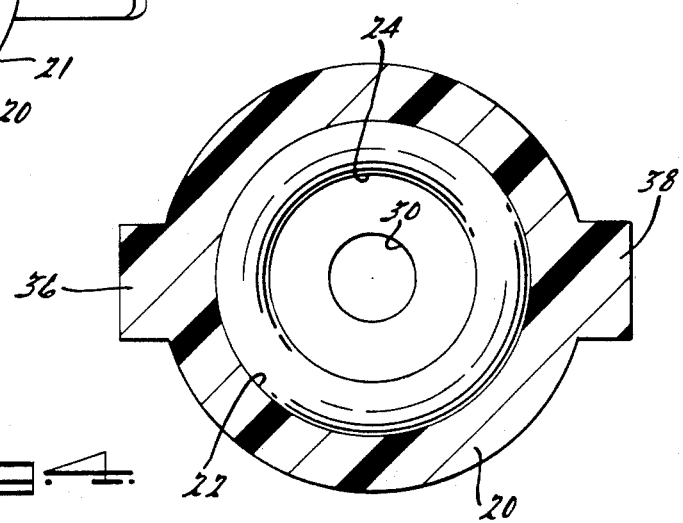

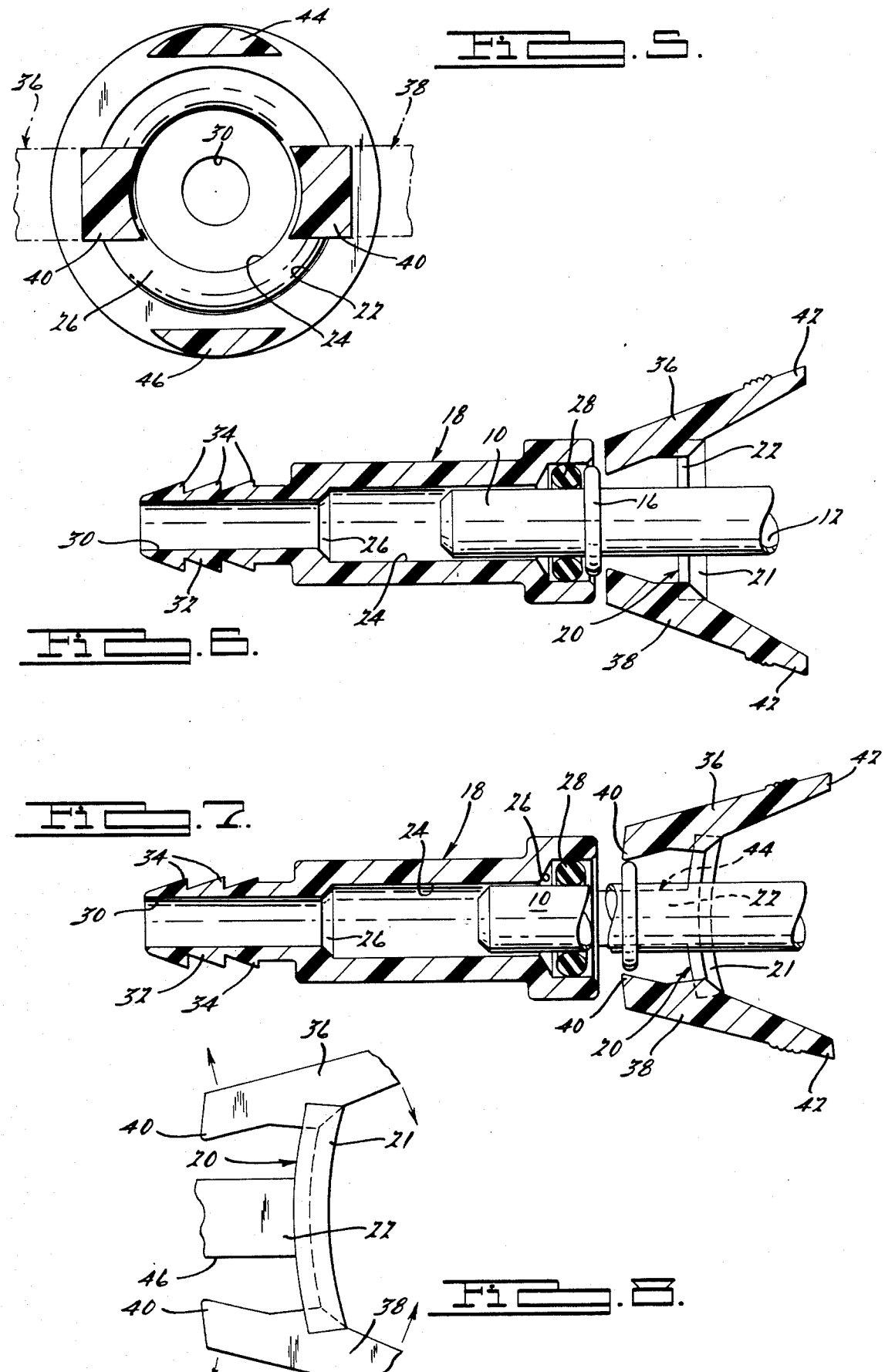

TUBE COUPLING MECHANISM

BACKGROUND OF THE INVENTION

Tubing couplings mechanisms exist in many forms and designs and are disclosed in a great number of prior patents. The coupling disclosed in U.S. Pat. No. 418,513 to Hackley is specifically designed to connect a hose to a kitchen faucet or the like. It uses two semi-cylindrical jaws parts which are hinged together by a pin. A seal with the faucet is established and maintained by portions of the jaw members. A disadvantage of this device is its rather complex multi-piece assembly.

The U.S. Pat. Nos. 3,245,703 and 3,826,523 to Manly and to Eschbaugh, respectively, also disclose coupling mechanisms. Basically, the Manly patent discloses a coupling mechanism with two parts. A male part has radially extendable fingers and a cooperative female part has a grooved recess to receive the fingers. The Eschbaugh patent discloses a mechanism utilizing a tube end as a male part of the coupling device in much the same manner as in the subject device. Further, Eschbaugh discloses a two part female portion. One of the portions forms a receiver for the tube end while the other portion forms a locking mechanism to hold the tube and coupling device together. Lastly, U.S. Pat. No. 4,123,091 to Cosentino discloses a coupling mechanism consisting of two portions. One part includes a jaw-like configuration to engage a channel formed in the other part. This holds the coupling mechanism together.

SUMMARY OF THE INVENTION

The subject coupling mechanism is adapted for connecting fluid carrying tubes or the like in a pressurized fluid circuit. The coupling device is both a simple and inexpensive device and a very useful device that permits simple one-handed engagement. It consists of an unitary moldable device with an interior passage to receive one end of a tube. The only other part which i need is an O-ring type seal which is housed in the device or may be supported on the tube end.

The coupling device has at least two manually operated activators which are integrally attached to a flexible part or extension of the coupling body. A tube end is configured with an annular collar thereabout near the end. A simple insertion of the tube and collar into the body of the coupling device conditions the actuators of the device to receive the tube and subsequently engage the collar to inhibit reverse movement of the collar and tube outwardly from the device. An almost equally simple procedure disengages the tube from the device. For disengagement, an inward force is applied against the actuators which unblocks the collar and tube end which are then moved from the coupling device.

Accordingly, an object of the invention is to provide an inexpensive tube coupling device useful in pressurized fluid circuits which device has an unitary body with annular end configuration adapted to receive an end of a tube and also flexibly support manually actuated tube securing portions of the coupling device.

A further object of the invention is to provide a tube coupling device for pressurized fluid circuits incorporating an unitary body configured with an annularly shaped tube end receiver which also serves to flexibly support actuation levers movable to provide locking and unlocking of the tube with respect to the coupling device.

Further objects and advantageous features of the subject one piece tube coupling mechanism will be more readily apparent and appreciated after reading of the detailed description of a preferred embodiment, reference being had to the drawings of the preferred embodiment described below.

IN THE DRAWINGS

FIG. 1 is a perspective and sectioned view of the coupling device with a tube end arranged in a pre-assembly position; and FIG. 2 is an enlarged planar view of the coupling device shown in FIG. 1; and FIG. 3 is an enlarged end view of the coupling device shown in FIG. 2 and looking in the direction of arrows 3—3 therein; and FIGS. 4 and 5 are sectioned views of the coupling device taken along section lines 4—4 and 5—5 in FIG. 2 looking in the direction of the arrows; and FIG. 6 is an elevational sectioned view of the coupling device and the associated tube end in an assembled condition; and FIG. 7 is a view similar to FIG. 6 showing the coupling device and the associated tube end in a disassembly position; and FIG. 8 is a fragmentary and enlarged elevational view of the coupler's annular end portion which flexibly supports the actuators and shown in the flexed disengagement condition corresponding to FIG. 7.

DETAILED DESCRIPTION OF A PREFERRED EMBODIMENT

In FIG. 1, a portion of a tube and specifically an end portion 10 thereof is illustrated. In an automobile environment, the tube is adapted for use in transporting pressurized fluid such as engine coolant, for example. The tube has an interior passage 12 to pass pressurized fluid. Tube end 10 is configured with a generally conically shaped end portion 14 and a radially outwardly projecting integral collar 16 thereabout.

The conically shaped end portion 14 may also be in the form of a rounded configuration. Its purpose is to smoothly guide the tube end 10 into a receiving end of a coupling device or mechanism 18. Specifically, the coupling device 18 has a body which is molded of elastomeric material in a relatively complex configuration. The body includes an annularly shaped end portion 20 which defines a conically configured surface 21 as well as a generally cylindrical guide surface 22 for receiving and guiding the tube end. Located to the left of the annulus 20 in FIG. 1, the body has an internal passage 24 therethrough. The passage 24 is dimensioned to be relatively closely fitting with respect to the tube as seen in FIG. 6. The cylindrical guide 22 is of larger diameter so as to more easily accept the tube. The two cylinders 22 and 24 are interconnected by a shoulder portion which integrally joins the different sized cylinders and defines an interior surface 26. An O-ring 28 engages the surface 26 and is thus limited in leftward movement as the tube end 10 is inserted into the body. The purpose of the O-ring 28 is to form a leak resistant engagement with the tube end 10.

To the left in FIG. 1, the coupling body has another passage 30 through an end portion 32 and connected to passage 22. The end portion 32 has its exterior surface configured for insertive assembly into a hose (not shown). A series of circumferentially extending ridges or barbs 34 are formed on the exterior surface which tend to secure the hose to the end portion 32. If desired, a hose clamp (not shown) could be utilized.

The coupling device 18 initially receives tube end 10 through the annulus 20 and into cylinder 22. Subsequently, the tube end 10 is extended into cylinder 24 as shown in FIGS. 6 and 7. It is desirable that the tube end 10 be easily inserted into the coupling member and it is essential that it be axially fixed therein. Accordingly, a pair of actuators or levers 36, 38 are provided and supported by the coupling body. Specifically, the levers 36 and 38 are integrally attached near their midpoints to the annulus 20. The levers 36, 38 are inclined with respect to the axes of the coupling body and the cylindrical passages 22 and 24. The radially inwardly located end portions 40 axially project from the rightward end of the annulus 20 and towards the end 32. The end portions 40 normally extend radially inward sufficiently to interfere with the outwardly projecting collar 16 of the tube end 10. In other words as shown in FIG. 6, the end portions 40 block rightward movement of the collar 16 and tube from the assembled position. As shown in FIG. 7, the end portions 40 are forced to move radially outward as the collar 16 is moved to the left and past the end portions 40. Likewise, when it is desired to disassemble the tube end 10 from the coupling body, it is only necessary to squeeze the lever's outwardly located end portions 42 in the radially inward direction. This squeezing action causes end portions 40 to move radially outward to produce a clearance between the two end portions 40. This clearance allows the tube end 10 with collar 16 thereon to be disassembled from the coupling body 18 by rightward movement from the position in FIG. 6 and as shown in FIG. 7.

The actuator levers 36 and 38 need to be supported accurately in relation to the remainder of the body 18. It is important that the previously described insertive assembly of the tube end 10 into the body 18 produce the desired outward movement of actuator ends 40 and then inward movement to secure the tube end 10 and collar 16 in the body 18 by blocking axially outward movement of the tube. Also, for disassembly by the aforedescribed squeezing action of the actuator levers 36 and 38, the operational movement of the actuator levers must be consistently accurate.

To insure the operational results described in the previous paragraph, the actuator levers 36 and 38 are uniquely supported relative to the body 18. Specifically, the midportions of the actuator members 36 and 38 are integrally connected to the annulus 20 as perhaps best shown in FIGS. 1, 4, 6 and 7. The annulus itself is integrally attached to the rest of the coupling body 18 by a pair of elongated support arms 44 and 46. The arms 44, 46 are located diametrically opposite one another and substantially midway between the actuator levers 36, 38 as best shown in FIG. 5. The arms 44, 46 define portions of the guide surface 22 described above and are configured to be thin in the radial direction and relatively wide in the circumferential direction as also best shown in FIG. 5. This produces a strong support for the annulus 20 to resist any significant bending in the circumferential direction as would be produced by the squeezing action during disassembly. The thin radial dimension of the arms 44, 46 is sufficient because they are not subject to any significant radially directed forces during assembly or disassembly. The construction of the support described above permits the previously described movement of the levers 36, 38 by relatively light flexing of practically the entire annulus 20 as best shown in FIG. 8. This drawing figure shows the stressed condition and action of the annulus 20 and its support arms 46 and 48 (behind 46). The even bending of the annulus 20 should be noted. Resultantly, the flexing operation is relatively mild and permanent sets of the elastomeric material are avoided thus producing continuously accurate operation of the coupling device.

The afore described support construction by the arms 44, 46 for the annulus 20 and actuator levers 36, 38 is superior to the common practice of mounting levers or the like to a rigid member and permitting movement by flexing of a small dimensioned "living hinge." That construction normally results in permanent sets in the material and operational inaccuracies. Although only a single embodiment of the invention has been illustrated and described in detail, it should be understood that modifications may be made which clearly fall within the scope of the claims that follow and which define the invention.

We claim:

1. A coupling device for tubing used in a pressurized fluid circuit to permit simple assembly and disassembly between the coupling device and a tube end, the tube end having a radially outwardly projecting collar, the coupling device, comprising: the coupling device including an elongated body portion molded of elastomeric material and with passage means extending axially therethrough for the flow of fluid; the passage means including a first bore dimensioned only slightly larger than the tube to permit insertion thereof into the body, a second bore dimensioned slightly larger than the collar to permit insertion thereof into the body and a radially extending shoulder therebetween to limit axial insertion of the collar into the body; an annulus spaced axially away from the remainder of the coupling body and the second bore therein and with its interior opening being coaxial with and of substantially the same dimension as the second bore; support means extending between the annulus and the remainder of the coupling body, the support means being integral with the annulus and the remainder of the body and having an inwardly facing surface which guides the tube end into the body and specifically into the second bore; an elongated actuator lever integrally attached near its midportion to the annulus and at a position equidistant from the attachment of the annulus to the support means, the lever having a radially inwardly positioned end portion and a radially outwardly positioned end portion, the inwardly positioned end engaging the tube collar during and after assembly and the outwardly positioned portion adapted for manually applied forces to disassemble the tube from the coupling device, whereby the inwardly positioned end of the lever is moved radially outward from an assembled position blocking axial movement of the collar and tube end to a disassembly position unblocking axial movement of the collar as the tube end is withdrawn from the coupling body, the movement of the level permitted by the gentle bending of the annulus from an unstressed plane to a stressed non-planar configuration.

2. The coupling device set forth in claim 1 in which the axis of the elongated lever is inclined relative to the axis of the coupler body and oriented with the inwardly positioned end portion nearest to the shoulder of the body so that during insertive assembly of the tube end into the body, the collar engages the lever initially between the lever's midportion and the inwardly positioned end and then progressively engages lever portions closer to the inwardly positioned end as the collar moves into the body until finally the collar passes by the inwardly positioned end whereafter the lever returns inward to its rest position whereby the collar is blocked from movement from the body by the end portion of the lever.

3. The coupling device set forth in claim 1 in which the outwardly positioned portion of the lever is normally spaced from the coupler body and is readily accessible for application of a manually applied, inwardly directed force during disassembly of the tube end from the coupling device whereby the inwardly positioned end of the lever is moved to an unblocking position with respect to the collar.

4. The coupling device set forth in claim 1 in which the annulus is configured with a conical surface on its outer end inclined so that upon engagement by the tube end during assembly the tube end is directed through the opening defined by the annulus and into the coupling body and whereby the flexure of the annulus toward the disassembly stressed position is enhanced by the resultant non-rectangular cross section.

5. A coupling device for tubing used in a pressurized fluid circuit to permit simple assembly and disassembly between the coupling device and a tube end, the tube end having a radially outwardly projecting collar, the coupling device, comprising: the coupling device including an elongated body molded of elastomeric material and with passage means extending axially therethrough for the flow of fluid; the passage means including a first bore dimensioned only slightly larger than the tube to permit insertion thereof into the body, a second bored dimensioned larger than the collar to permit the insertion thereof into the body and a radially extending shoulder between the first and second bores to limit axial insertion of the collar into the body; an annulus spaced axially away from the remainder of the coupling body and the second bore therein, the interior opening of the annulus being coaxial with and substantially the same dimension as the second bore; a pair of elongated arms extending between the annulus and the remainder of the coupling body, the arms being integrally formed with the annulus and the remainder of the body, the arms being positioned diametrically opposite one another and having inwardly facing surfaces which guide the tube end into the body and the second bore; at least one elongated actuator lever integrally attached near its midpoint to the annulus at a position midway between the attachment of the annulus to the arms, the lever having a radially inwardly positioned first end portion and a radially outwardly positioned second end portion, the first end portion engaging the tube collar during and after the insertive assembly of the tube end into the body, the second end portion adapted for application of manually applied inwardly directed force to disassemble the tube end from the body permitted by a radially outward movement of the first end portion and resultant unblocking of the collar thus permitting withdrawal from the body, the pivotal movement of the lever produced by mild bending of the annulus from a normally unstressed planar configuration into a stressed non-planar configuration.

6. The coupling device set forth in claim 5 in which the axis of the elongated lever is inclined relative to the axis of body and is oriented with the first inwardly positioned end portion nearest to the shoulder of the body so that during insertive assembly of the tube end to the into the body, the collar engages the lever initially between the lever's midportion and the first end thereof and then progressively engages lever portions closer to the first end portion as the collar moves into the body until finally the collar passes by the first end portion whereafter the lever returns to its rest position and whereby the collar is blocked from movement from the body by the first end portion of the lever.

7. The coupling device set forth in claim 5 in which the second end portion of the lever is normally spaced outwardly from the body and is readily accessible for the application of a manually applied, inwardly directed force during disassembly of the tube end from the body whereby the first end portion of the lever is moved to an unblocking position with respect to the collar.

8. The coupling device set forth in claim 5 in which an O-ring seal is positioned adjacent the shoulder and thus positioned for application about the tube end and between the collar and the shoulder when the tube end is assembled into the coupling body.

9. The coupling device set forth in claim 5 in which the annulus is configured with a conical surface in its outer end which is inclined to guide the tube end through the opening in the annulus during insertive assembly of the tube end into the coupling and whereby the flexure of the annulus toward the disassembly stressed condition is enhanced by the resultant non-rectangular cross-sectional configuration.

* * * * *